United States Patent [19]

Cheng

[11] 4,219,582

[45] Aug. 26, 1980

[54] XANTHAN GUM AND LOCUST BEAN GUM IN CONFECTIONERY USE

[75] Inventor: Hsiung Cheng, San Diego, Calif.

[73] Assignee: Merck & Co., Inc., Rahway, N.J.

[21] Appl. No.: 24,936

[22] Filed: Mar. 29, 1979

[51] Int. Cl.² .......................... A23G 3/00; A23L 1/04
[52] U.S. Cl. ..................................... 426/578; 426/661
[58] Field of Search ............... 426/573, 578, 658, 660, 426/661

[56] References Cited

U.S. PATENT DOCUMENTS

| | | | |
|---|---|---|---|
| 1,928,901 | 10/1933 | Krno et al. | 426/578 |
| 2,193,470 | 3/1940 | Bergquist | 426/578 |
| 2,726,960 | 12/1955 | Bolanowski | 426/578 |
| 2,938,797 | 5/1960 | Toulmin | 426/660 |
| 3,038,809 | 6/1962 | Fitzmaurice et al. | 426/578 |
| 3,097,951 | 7/1963 | Greninger et al. | 426/578 |
| 3,446,628 | 5/1969 | Schoch et al. | 426/578 |
| 3,582,359 | 6/1971 | Horn et al. | 426/660 |
| 3,589,909 | 6/1971 | Godzichi et al. | 426/578 |

*Primary Examiner*—Jeanette M. Hunter
*Attorney, Agent, or Firm*—Gabriel Lopez; Hesna J. Pfeiffer; Julian S. Levitt

[57] ABSTRACT

From 0.08 to 0.50% (weight) of a 1:3 to 3:1 blend of xanthan gum and locust bean gum can be employed in high solids starch jelly confectionery products to decrease the setting time of such products.

6 Claims, No Drawings

XANTHAN GUM AND LOCUST BEAN GUM IN CONFECTIONERY USE

DISCUSSION OF THE PRIOR ART

Xanthan gum has been used in combination with galactomannan gums, either locust bean gum or guar gum. Specifically, the xanthan gum and guar gum combination for use as stabilizer in ice creams, or frozen desserts, is taught in U.S. Pat. No. 3,996,389. This latter patent also teaches the three-component mixture, Col. 2, line 10, as a suitable ice cream stabilizer mixture. Combination of xanthan gum with locust bean gum is also taught in food use, see Kovacs, *Food Technology* 27 (3) 26–28, 30 (1973); British Pat. No. 1,324,557; British Pat. No. 1,458,946; *Food Engineering* 44 (12) 55 (1972); Kovacs et al., *Food Product Development* 10 (8) 32–38 (1976). None of these references relates to the use of these gums in candy or confectionery use; in fact, the literature uses generally relate to products having a solids level of from 5–45%. By contrast, the confectionery use of this invention is primarily in candies and confections having solids level higher than 60%.

ADVANTAGES OVER THE PRIOR ART

The particular xanthan gum-locust bean gum combination of this invention is especially valuable in formulating starch jelly candies. As these candies are produced by cooling a gellable syrup, which requires a prolonged gelling time in the mold, a food gelling agent which can reduce setting time will be commercially valuable.

The starch jelly candies most benefited by the addition of the gum blend of this invention are blends of cooked starch, water, sugars, and flavoring agents. The starches used vary but are generally thin-boiling corn, sorghum, and wheat starches, modified to the 30–90 fluidity level, or high amylose starches; these usually contain amylose at levels up to about 70%. Other starches and starch blends used in the industry are well known. See, in this regard, U.S. Pat. No. 3,446,628 for general properties of the starch and starch jellies.

SUMMARY OF THE INVENTION

It has now been found that from about 0.08 to about 0.50% (weight basis) of a 1:3 to 3:1 gum blend of xanthan gum-locust bean gum can be employed in formulating starch jellies which decreases the setting time. Preferably about 0.2–0.4% of a 1:1 blend is employed.

Examples of this invention follow:

EXAMPLE 1

The following formulation was employed in making gum confections:

| Ingredients | Weight/Grams |
| --- | --- |
| 42 D.E. corn syrup | 560 |
| Sugar | 380 |
| ECLIPSE G Starch (Thin boiling starch, A.E. Staley Mfg. Co.) | 120 |
| KELTROL F (Xanthan gum, Kelco Company) | 3 |
| Locust bean gum | 3 |

-continued

| Ingredients | Weight/Grams |
| --- | --- |
| Water | 934 |

Add water in a steam-heated kettle. Dry blend all the dry ingredients well and add to water with good agitation. Add corn syrup, cook and boil the mixture until 228° F. is reached and the solids content is 78–79%. The hot mixture was then deposited into starch molds and allowed to set at room temperature. Within 30 minutes after depositing, the gum confection had attained sufficient gel structure to permit removal and sugaring without further holding time. Without adding the xanthan gum and locust bean gum, the regular thin boiling starch confections require 42–48 hours in the hot conditioning room. These two types of confections are similar in body, texture and mouth-feel.

EXAMPLE 2

The following formulation was employed in making confections.

| Ingredients | Weight/Pounds |
| --- | --- |
| 42 D.E. corn syrup | 48 |
| Sugar | 32 |
| MIRA-QUICK C Starch (high amylose starch, A.E. Staley Mfg. Co.) | 7 |
| KELTROL F (xanthan gum, Kelco Company) | 0.2 |
| Locust bean gum | 0.2 |
| Water | 12.6 |

Add water in a steam-heated kettle. Dry blend KELTROL F, locust bean gum and 3 pounds sugar well, added to water with good agitation and heated to 180° F. to hydrate the gums. Add the rest of the ingredients and preheated to 160° F., then cooked through a steam injection cooker at 340° F. Refractometer readings on the hot mixture indicated actual solids content in the range of 82–83%. The hot mixture was then deposited into starch molds and allowed to set at room temperature. Within 30 minutes after depositing, the gum confection had attained sufficient gel structure to permit removal and sugaring without further holding time. Without adding the xanthan gum and locust bean gum, the regular high amylose starch confections require 8–12 hours in the hot conditioning room to gain the required gel structure for demolding.

Having described the invention, what is claimed is:

1. A starch jelly confectionery product having sugar, starch and color and flavoring agents, also comprising from about 0.08 to 0.50% by weight of a 1:3 to 3:1 blend of xanthan gum and locust bean gum.

2. The product of claim 1 in which the weight % of the gum blend employed is from 0.2% to 0.4%.

3. The product of claim 2 in which the ratios of the gums employed is about 1:1.

4. The process of decreasing setting time in starch jelly confectionery product, by using about 0.08 to about 0.50% by weight of a 1:3 to 3:1 blend of xanthan gum and locust bean gum.

5. The process of claim 4, in which from 0.2% to 0.4% of the gum blend is used.

6. The process of claim 4, in which the ratios of the gums is about 1:1.

* * * * *